(12) United States Patent
Wilson (10) Patent No.: US 8,246,273 B2
(45) Date of Patent: Aug. 21, 2012

(54) ASSEMBLAGE AND METHOD FOR UNDERSEA LAYING OF PIPELINE FROM A SHIP SPOOL

(76) Inventor: Michael W. N. Wilson, Aberdeen (GB)

(*) Notice: Subject to any disclaimer, the term of this patent is extended or adjusted under 35 U.S.C. 154(b) by 228 days.

(21) Appl. No.: 12/460,496

(22) Filed: Jul. 20, 2009

(65) Prior Publication Data

US 2011/0013988 A1  Jan. 20, 2011

(51) Int. Cl.
*F16L 1/20* (2006.01)

(52) U.S. Cl. .................. 405/168.4; 405/168.3; 405/166

(58) Field of Classification Search .................. 405/158, 405/168.1, 168.2, 168.3, 168.4, 169, 170, 405/166

See application file for complete search history.

(56) References Cited

U.S. PATENT DOCUMENTS

| | | | |
|---|---|---|---|
| 3,680,342 A | 8/1972 | Mott et al. | |
| 3,855,835 A * | 12/1974 | Tisdale et al. | 405/168.3 |
| 3,872,680 A * | 3/1975 | Nicholson et al. | 405/168.3 |
| 3,965,713 A | 6/1976 | Horton | |
| 3,982,402 A * | 9/1976 | Lang et al. | 405/168.3 |
| 4,230,421 A | 10/1980 | Springett et al. | |
| 4,269,540 A | 5/1981 | Uyeda et al. | |
| 4,297,054 A * | 10/1981 | Yenzer et al. | 405/168.3 |
| 4,340,322 A | 7/1982 | Springett et al. | |
| 4,345,855 A | 8/1982 | Uyeda et al. | |
| 4,410,297 A * | 10/1983 | Lynch | 405/168.3 |
| 4,538,937 A | 9/1985 | Lynch | |
| 4,721,410 A | 1/1988 | Recalde | |
| 4,820,082 A * | 4/1989 | Recalde | 405/168.3 |
| 5,421,675 A | 6/1995 | Brown et al. | |
| 5,533,834 A * | 7/1996 | Recalde | 405/168.1 |
| 6,328,502 B1 * | 12/2001 | Hickey et al. | 405/168.4 |
| 6,733,208 B2 * | 5/2004 | Stockstill | 405/168.4 |
| 6,910,830 B2 * | 6/2005 | Endal | 405/168.1 |
| 2002/0006314 A1 * | 1/2002 | Willis | 405/168.2 |
| 2004/0062611 A1 * | 4/2004 | Endal | 405/168.1 |
| 2005/0036842 A1 | 2/2005 | Stockstill | |

FOREIGN PATENT DOCUMENTS

| | | |
|---|---|---|
| EP | 0 507 572 A1 | 10/1992 |
| GB | 1 507 959 A | 4/1978 |
| GB | 2 336 191 A | 10/1999 |
| WO | WO 93/06402 A1 | 4/1993 |
| WO | WO 2006/054891 A1 | 5/2006 |
| WO | WO 2008/096107 A2 | 8/2008 |
| WO | WO 2009/077711 A1 | 6/2009 |

* cited by examiner

*Primary Examiner* — Frederick L Lagman
(74) *Attorney, Agent, or Firm* — Gable Gotwals (57) ABSTRACT

In undersea laying pipeline which is being unreeled from a ship spool in a plastically deformed state, the pipeline is straightened from the plastic state into a behaviorally elastic state as it is unreeled. The straightened pipeline is dispensed in the behaviorally elastic state through a downstream pipe tensioner while the straightened pipeline upstream of the tensioner is maintained in the behaviorally elastic state. The pipeline laying assemblage may include a flange weld station immediately upstream of the tensioner and/or an anode weld station downstream of the tensioner in the above-waterline freeboard of the ship. The pipeline laying method reduces the number of components and the size and cost of the ships in comparison to conventional systems.

19 Claims, 9 Drawing Sheets

ASSEMBLAGE AND METHOD FOR UNDERSEA LAYING OF PIPELINE FROM A SHIP SPOOL

BACKGROUND OF THE INVENTION

This invention relates generally to the laying of off-shore pipelines and more particularly concerns an assemblage and method for undersea laying of pipeline from a ship spool.

In present practice, undersea pipelines are often laid in lengths which have been reeled onto a ship spool at radii within the plastic deformation range of the pipe. The pipeline is unreeled from the spool to a tower which is pivoted at or above deck level for rotation of the upper end of the tower toward or away from the spool. The shallower the water in which pipeline is laid, the shallower the angle of inclination of the tower. At 20 meter water depths the tower approaches horizontal, while above 200 meter water depths the tower approaches vertical. Depths approximating 2000 meters are not uncommon.

The tower supports the components of the unreeling system including, in sequential order from the top of the tower, at least an aligner, a straightener and a tensioner, all above a work station located in the tower, and a holding clamp beneath the exit level of the pipeline from the tower to suspend the weight of the exited pipeline during work on pipeline in the tower above. For use in shallower depth applications, the distance from the tower pivot to the axis of rotation of the spool must be greater than the sum of the height of the tower plus the radius of the spool. The ship must be designed to accommodate this distance. The ship must also be designed to accommodate the weight and dimensions of the reeled pipeline and the tower and to compensate for the variations in buoyancy requirements resulting from the orientation of the tower and the weight of the unreeled pipeline suspended from the tower, which could be anywhere from 20 to 2000 meters in length. Moreover, all of these dimensional difficulties are compounded by the plasticity of the pipeline over the distance from the spool to the straightener which, depending on the orientation of the tower, ranges from more than half to more than the total height of the tower.

Bottom line, such a ship typically approximates 330 feet in length and, including the lay equipment on the ship, often leases for as much as $500,000 per day. It is, therefore, an object of this invention to provide a method and assemblage for reel laying off-shore pipelines which require smaller and/or less expensive ships than conventional pipe lay systems. It is also an object of this invention to provide a method and assemblage for laying off-shore pipelines which require less shipboard space than conventional pipe lay systems. A further object of this invention is to provide a method and assemblage for laying off-shore pipelines which employ fewer components than conventional pipe lay systems.

SUMMARY OF THE INVENTION

In accordance with the invention, a method and assemblage are provided for undersea laying of a pipeline which is being unreeled in a plastic state from a ship spool.

The method includes the steps of straightening the pipeline from the deformed plastic state into a straight behaviorally elastic state as it is unreeled and dispensing the straightened pipeline in the behaviorally elastic state through a downstream pipe tensioner while maintaining the straightened pipeline between the tensioner and the straightener in the behaviorally elastic state. Optionally, the steps may also include intermittently adding sacrificial anodes to the dispensed pipeline before entry into the sea and/or welding a flange to a first end of the pipeline before entry into the tensioner.

The assemblage includes a straightener which receives the pipeline which has been bent plastically and is not straight from the spool and dispenses the pipeline in its straight and behaviorally elastic state and a tensioner downstream of the straightener which receives and dispenses the pipeline in its behaviorally elastic state. The straightener may be a second tensioner to facilitate the spooling on and spooling off of the pipeline from the reel.

The straightener is mounted for reciprocation parallel to a rotational axis of the spool to shift the pipeline within a fleeting angle range which is compatible with maintaining the behaviorally elastic state of the pipeline between said straightener and said tensioner. The straightener is also mounted for motion into Cartesian coordinates corresponding with a variable release point of the pipeline from the spool to receive the pipeline in the not straight plastic state as the pipeline is unreeled from the spool. For example, the straightener can be mounted for angular motion about the rotational axis, or an axis parallel to a rotational axis, of the spool. The straightener is aligned, and preferably realignable, to release pipeline on an exit path from said straightener which is compatible with maintaining the behaviorally elastic state of the pipeline between the straightener and the tensioner. The straightener may be mounted on its own assembly separate from the spool.

Thus, in a preferred embodiment of the assemblage, a straightener-to-tensioner distance is selected which is coordinated with the desired tensioner angle and the alignment of the straightener in relation to the tensioner angle. The tensioner is capable of angular motion about an axis parallel to a rotational axis of the spool to align the tensioner to release pipeline in the straight and behaviorally elastic state on the desired predetermined initial exit path from the tensioner and the straightener is mounted in an alignment to release the pipeline on an exit path from the straightener which is coordinated with the exit path from the tensioner to maintain the behaviorally elastic state of the pipeline between exit from the straightener and entry into the tensioner. Furthermore, the straightener is mounted for reciprocation parallel to a rotational axis of the spool for shifting the pipeline within a fleeting angle range compatible with maintaining the behaviorally elastic state of the pipeline between exit from the straightener and entry into the tensioner.

The assemblage may also include a flange weld station immediately upstream of the tensioner and/or an anode weld station downstream of the tensioner above the waterline of the ship. The anode weld station shelters one or more workmen from sea turbulence and may including seals reducing splashing of turbulent seawater through the annulus surrounding the pipeline egress from the shelter.

BRIEF DESCRIPTION OF THE DRAWINGS

Other objects and advantages of the invention will become apparent upon reading the following detailed description and upon reference to the drawings in which.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Figure 1:
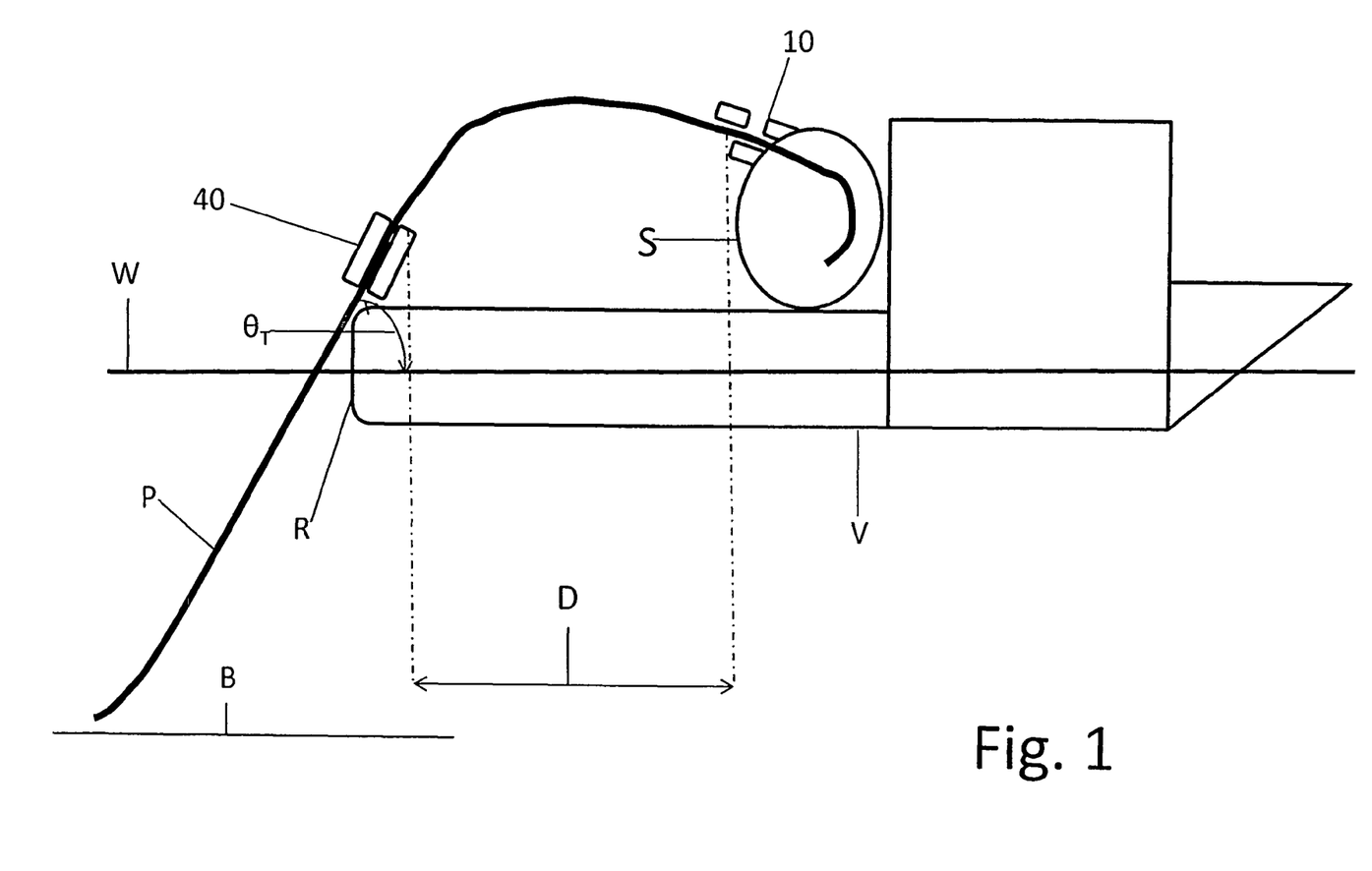
FIG. 1 is a block diagram illustrating a pipeline assemblage in accordance with the invention from a starboard side view of the ship carrying the assemblage.

Turning to FIG. 1, a pipeline P is being unreeled in a downstream direction from a spool S on a ship V travelling along the water surface W and released to lay on the sea bed B. The pipeline P, having been plastically deformed from straight, is stored on the spool S in its plastic state. The components of the pipelay assemblage include a straightener 10 and a tensioner 40 located downstream of the straightener 10. The straightener 10 receives the pipeline P in its deformed plastic state from the spool S and dispenses the straight pipeline P in a behaviorally elastic state toward the tensioner 40. If the straightener 10 and the tensioner 40 are relatively far apart, perhaps 40 meters or more, it may also be desirable to provide additional support for the pipeline P between the straightener 10 and the tensioner 40. This can be accomplished, for example, by use of a rollerbox (not shown) suspended from the ship's crane (not shown).

As seen in the embodiment of FIGS. 1-5, the spool S is located at approximately amidships for rotation about an axis $Y_s$ transverse to the keel of the ship V. As shown, the straightener 10 is attached to, and journalled for rotation in relation to, the spooling gear 11. Looking at FIGS. 4 and 5, as the pipeline P is distributed from the spool S, the spooling gear 11 rotates in relation to the spool rotational axis $Y_S$ and the straightener 10 rotates on the spooling gear 11 to maintain the straightener 40 in approximately horizontal relationship with the release level of the pipeline P from the spool S.

Figure 4:
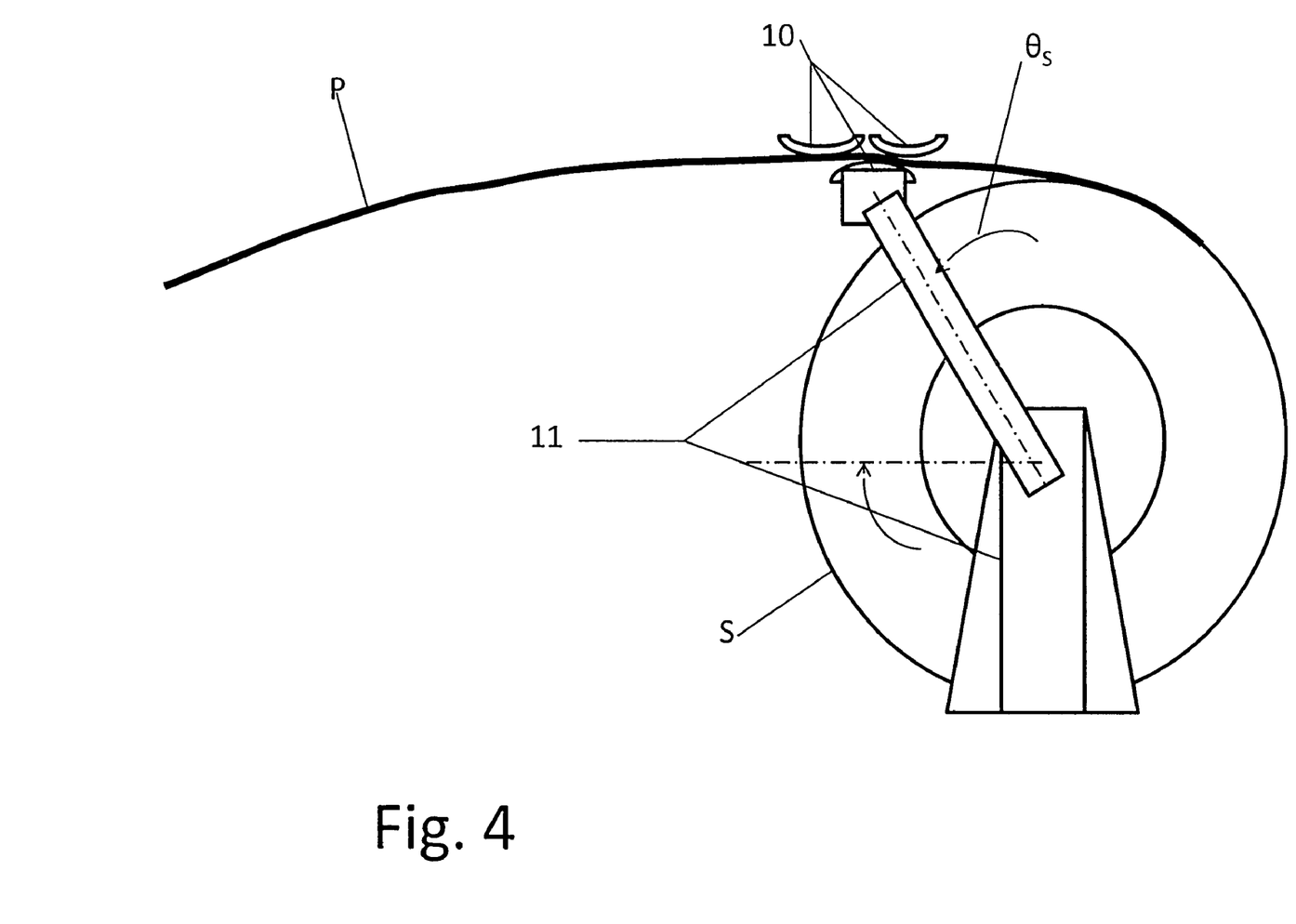
FIG. 4 is a block diagram of the straightener portion of the assemblage of FIG. 1 with the reel in a nearly full condition as viewed from the starboard side.

In the "full spool" condition shown in FIG. 4, the pipeline P is being unreeled from the spool S at approximately 12 o'clock for delivery to a tensioner 40 located at approximately 9 o'clock. The gear 11 is oriented at an angle $\theta_S$ positioning the straightener 10 at approximately 11 o'clock in relation to the rotational axis $Y_S$ of the spool S. As the spool S approaches the "empty spool" condition shown in FIG. 5, the angle $\theta_S$ has changed to position the straightener 10 at approximately 10 o'clock. Thus, as shown, the angle $\theta_S$ varies over a range of approximately 30° to accommodate the diameter of the spool S illustrated. It is also possible that the pipeline P can be unreeled from the bottom of the spool S in some applications. In this case, for a similar diameter spool S, the range of the angle θ may be shifted to lie from approximately 7 to 8 o'clock with the tensioner 40 remaining positioned at approximately 9 o'clock.

Figure 2:
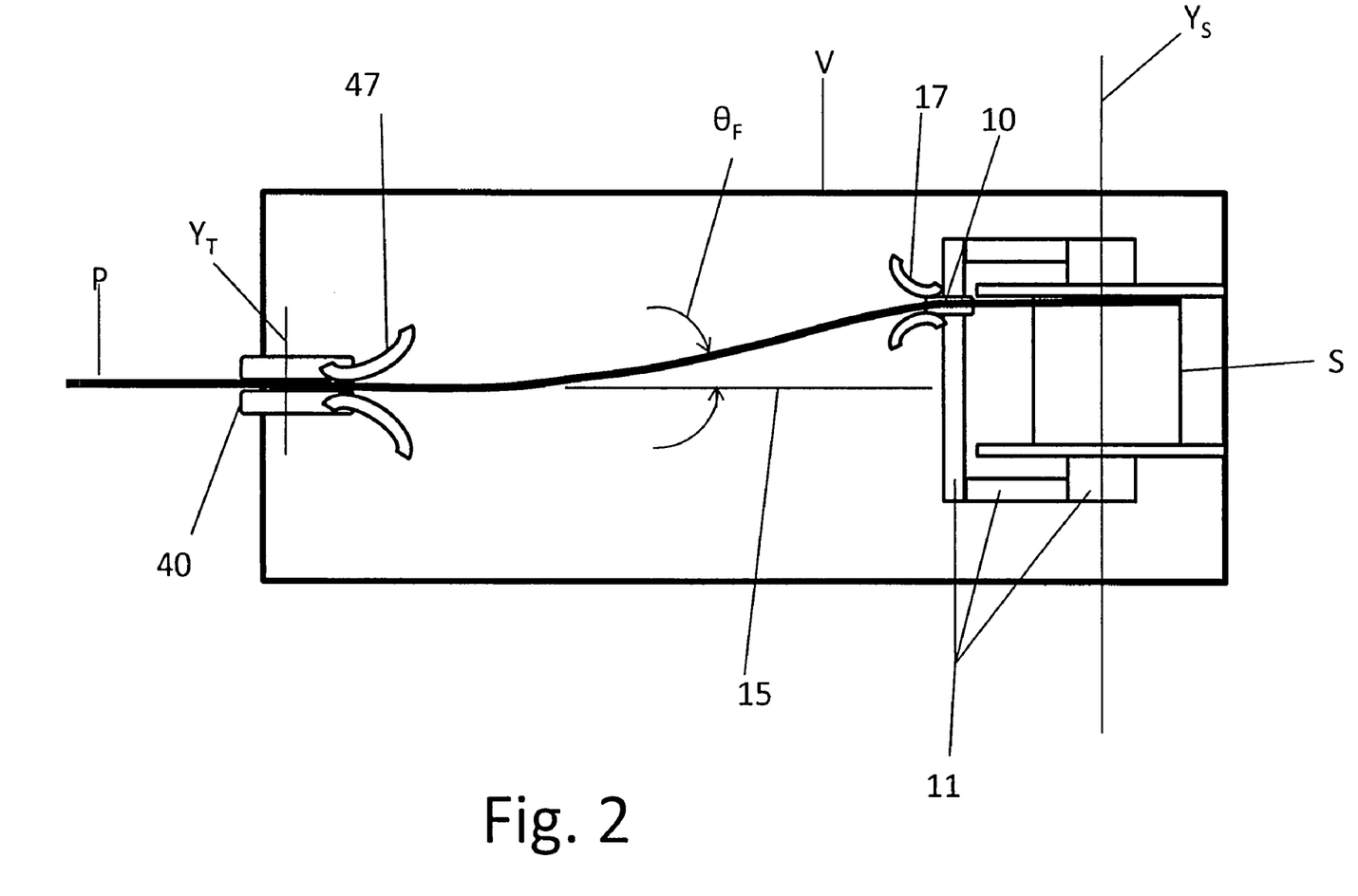
FIG. 2 is a block diagram of the assemblage of FIG. 1 viewed from above with the pipeline fleeting at a starboard side angle.
Figure 3:
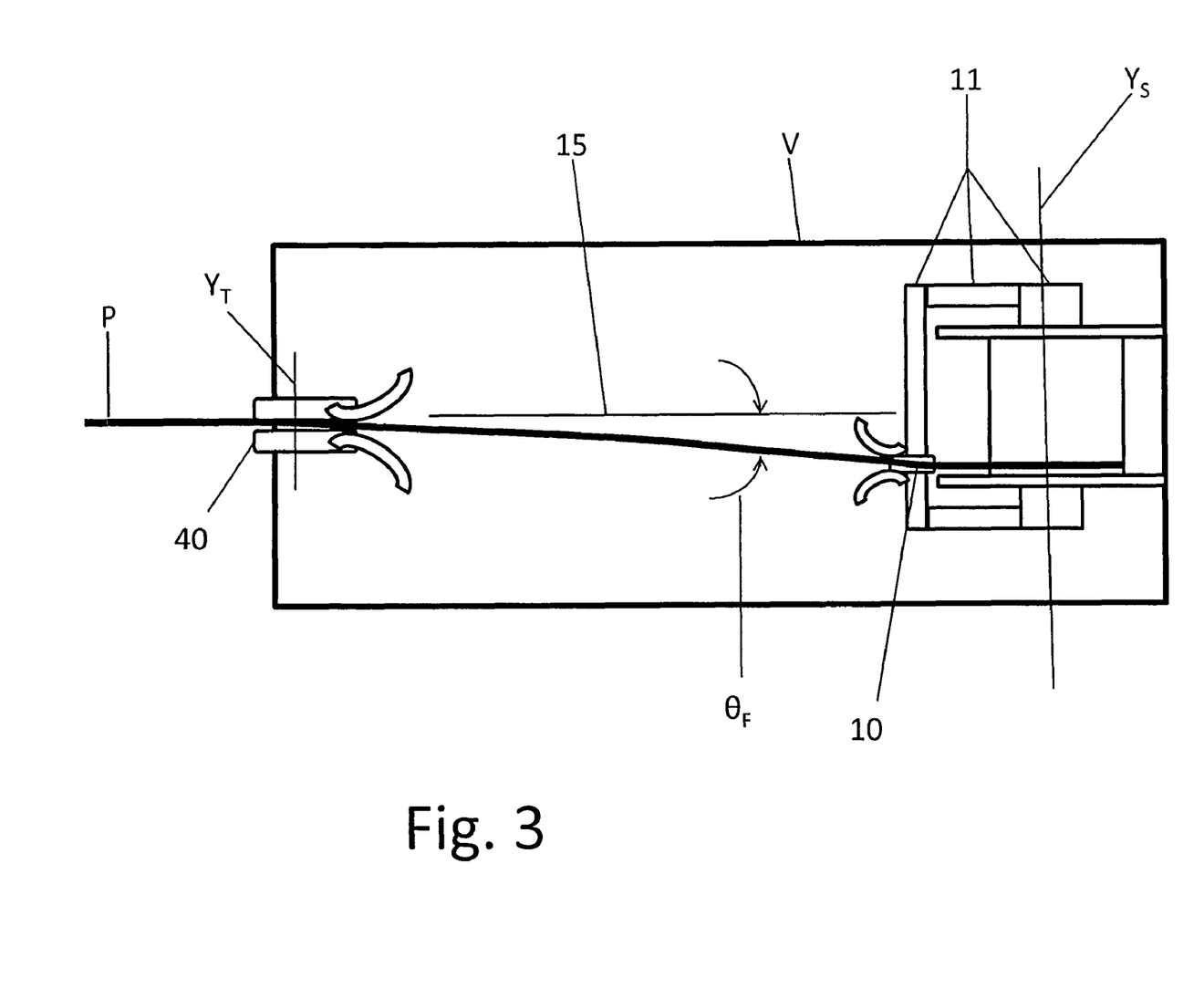
FIG. 3 is a block diagram of the assemblage of FIG. 1 viewed from above with the pipeline fleeting at a port side angle.

As is seen in FIGS. 2 and 3, the straightener 10 can be mounted for reciprocation parallel to the rotational axis $Y_S$ of the spool S to shift the pipeline P within a fleeting angle $\theta_F$. The fleeting angle $\theta_F$ is illustrated as the port and starboard deviations of the pipeline P from an axis 15 bisecting the spool S and extending to the point of entry of the pipeline P into the tensioner 40.

Looking at to FIGS. 1-3, the tensioner 40 as shown is located at the stem R and is pivoted for angular motion about an axis $Y_T$. As shown, the axis $Y_T$ is substantially parallel to the spool rotational axis $Y_S$. The angle $\theta_T$ at which the tensioner 40 is inclined is determined as a function of the water depth and ranges from approximately horizontal to vertical as the depth increases. As seen in FIG. 1, the angle $\theta_T$ is approximately 60°, as might normally be applicable for laying 6" to 8" pipeline P at depths in a range of 80 to 120 meters.

Figure 9:
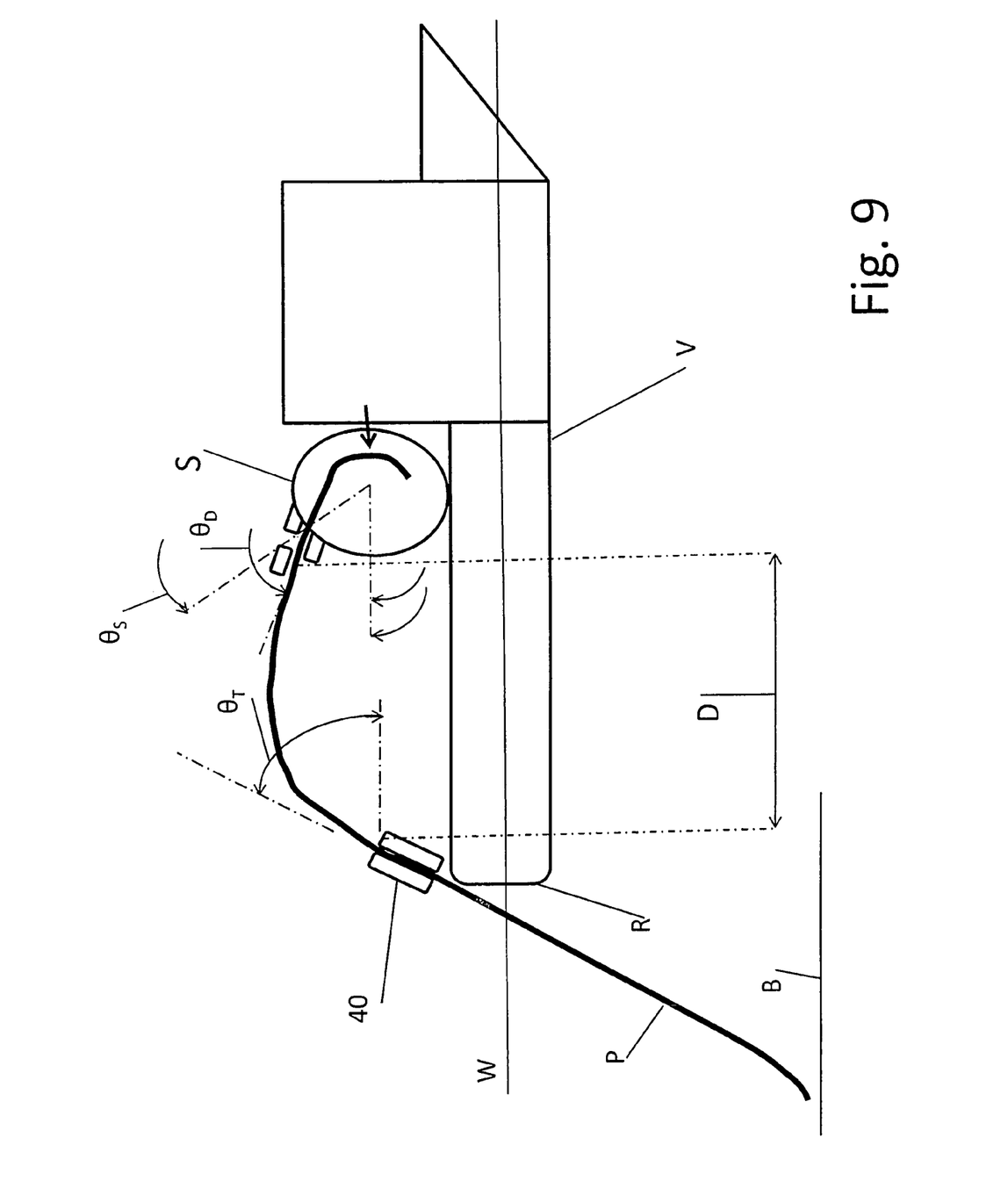
FIG. 9 is a block diagram illustrating another embodiment of a pipeline assemblage in accordance with the invention from a starboard side view of the ship carrying the assemblage.

Continuing to look at FIGS. 1-3, the portion of the pipeline P between the straightener 10 and the tensioner 40 is straight but maintained in a behaviorally elastic state. The state of the pipeline P is considered behaviorally elastic as long as the pipeline P is not permitted to bend to a radius less than an empirically determined radius at which the pipeline P would behave in the assemblage as though it had not been bent to a radius less than its nominal elastic bending radius. This is accomplished by coordination of the distance D between the straightener 10 and the tensioner 40 with the angle $\theta_T$ of the tensioner 40 and with the fleeting angle $\theta_F$. If in any application the straightener 10 could be aligned to receive the pipeline P in a non-horizontal direction, as is seen in the embodiment of FIG. 9, coordination would further consider the maximum angle $\theta_D$ by which the straightener 10 would deviate from horizontal and away from the tensioner 40. The range of the fleeting angle $\theta_F$ may, but need not, be limited to the tensioner angle $\theta_T$ adjusted, if necessary, by any straightener angle $\theta_D$. Typically, however, the fleeting angle $\theta_F$ between the straightener 10 and the tensioner 40 will generally be well within the tensioner angle $\Theta_T$ and within the range compatible with the behavioral elastic state of the pipeline P. Furthermore, as seen in FIGS. 2 and 3, aligners 17 and 47 may be mounted at the exit and entry points from and to the straightener 10 and the tensioner 40 to further assure that the pipeline P is not caused to exceed its behavioral elastic limits at these points.

Once the pipeline P has been straightened to its behaviorally elastic state, it will remain in the behaviorally elastic state unless force is applied to alter it back to the plastic state. The coordination of the angles $\theta_T$, $\theta_F$ and $\theta_D$ with the distance D between the rotational and pivotal axes $Y_S$ and $Y_T$ of the straightener 10 and the tensioner 40 and the absence of any force applying components therebetween assures that elasticity-overcoming force is not applied to the pipeline P between these assemblage components 10 and 40. The introduction of any such force applying components would require compensatory variations in the distance D.

Figure 5:
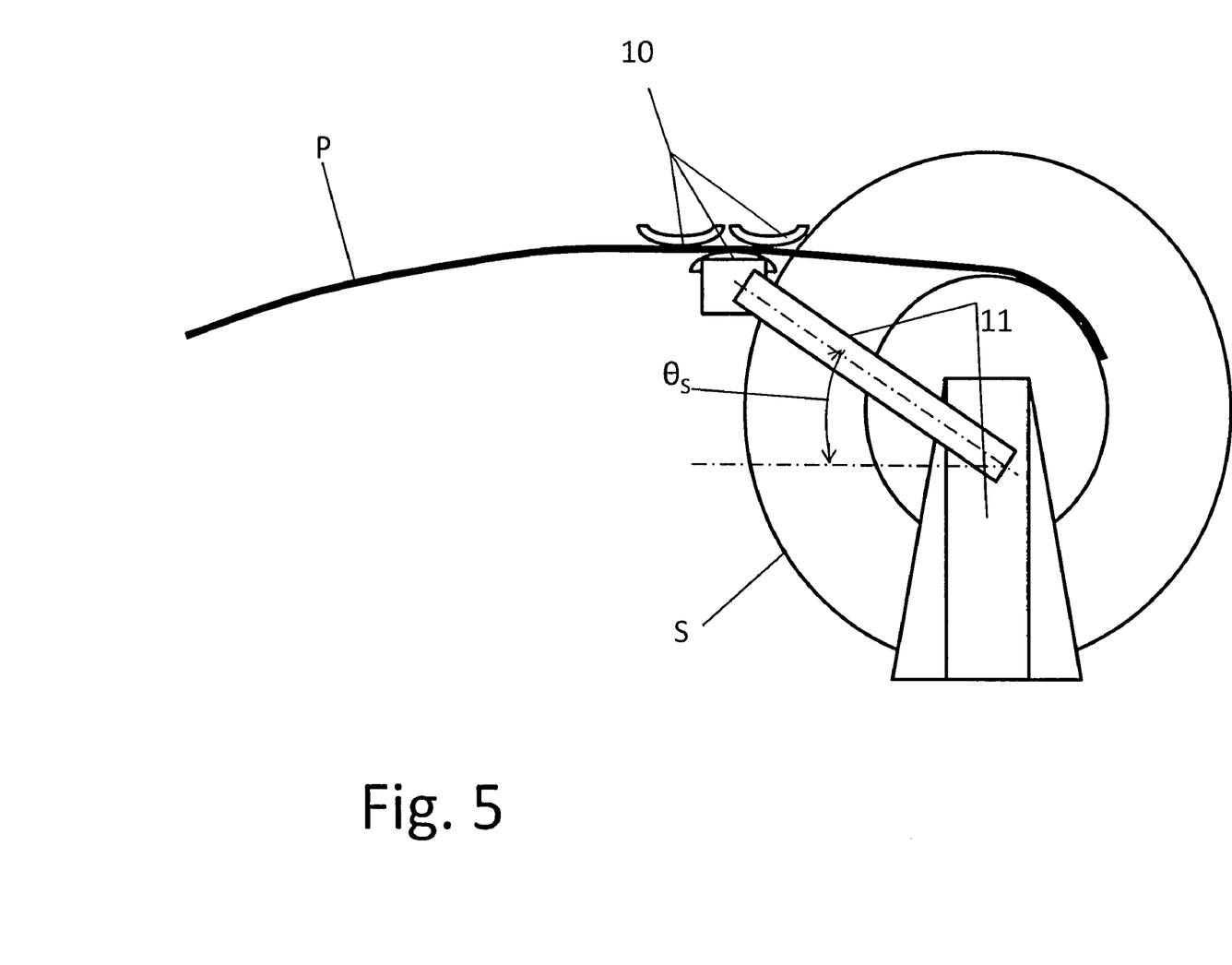
FIG. 5 is a block diagram of the straightener portion of the assemblage of FIG. 1 with the reel in a nearly empty condition as viewed from the starboard side.

To afford some perspective, for 6" to 8" ×65 pipelines P, the nominal radius of elasticity is in a range of 38 to 50 meters. If the straightener 10 receives the pipeline P horizontally as shown in FIGS. 4 and 5, the distance D could be as small or slightly smaller than the nominal radius. If the straightener 10 receives the pipeline P at an angle $\theta_D$ as shown in FIG. 9, the distance D would be somewhat greater.

The tensioner 40 can be located anywhere on the perimeter of the ship V or even at an opening through the ship V, a configuration known in conventional pipelay systems as a "moon pool." The spool S can be forward or aft of, starboard or port of, or yawed from the tensioner 40. In the "moon pull" configuration, the spool S can be above the tensioner 40 and the pipeline P released downwardly from 3 or 9 o'clock on the spool S.

In some applications, it may be desirable to attach the straightener 10 on the upstream side of the tensioner 40 rather than the downstream side of the spool S. The straightener 10 may itself be a second tensioner and/or be combined with the tensioner 40. Also, the spooling gear 11 can be mounted on the ship V independently of the spool S.

Figure 6:
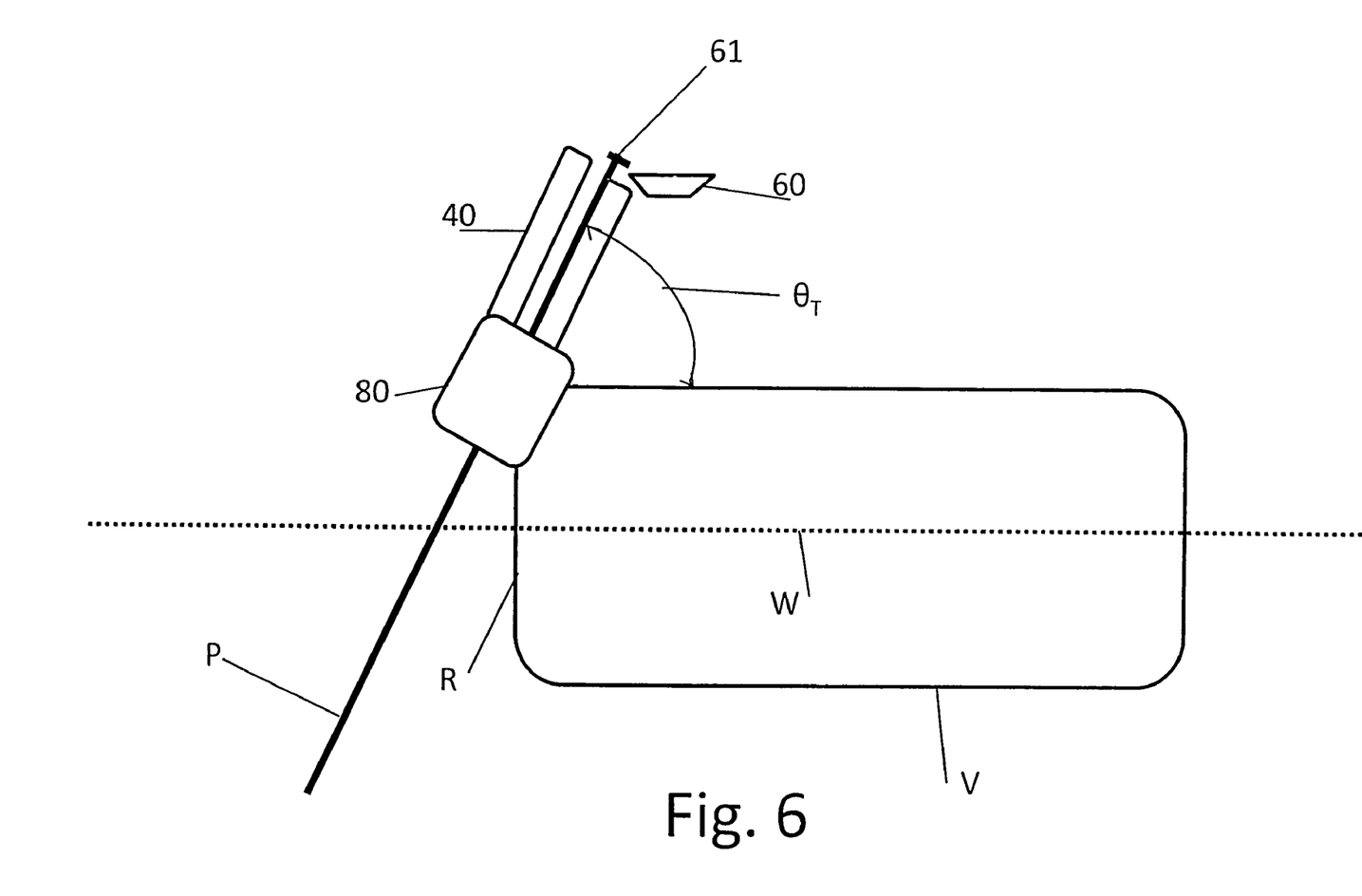
FIG. 6 is a block diagram of the tensioner portion of the assemblage of FIG. 1 as viewed from the starboard side.
Figure 7:
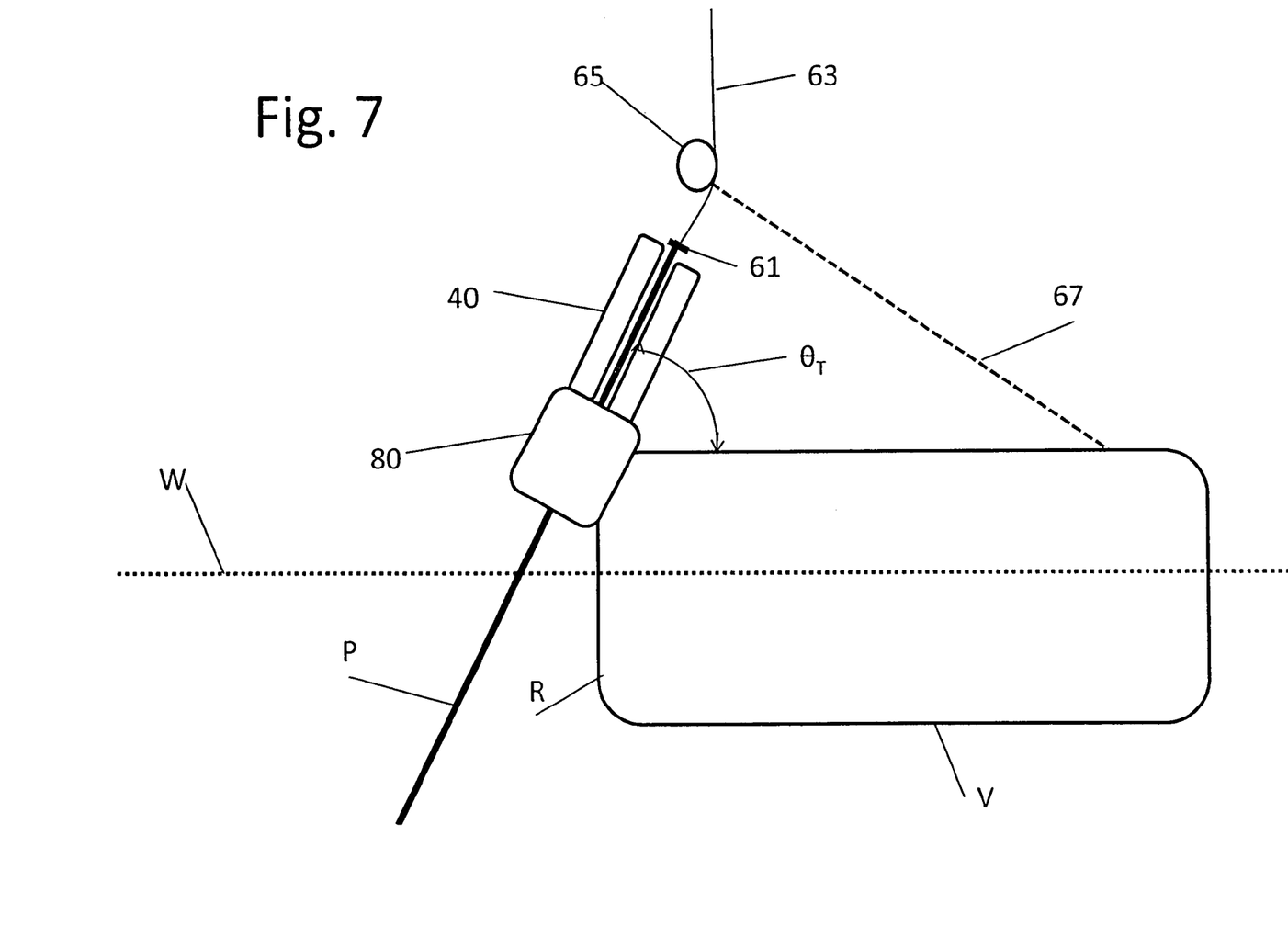
FIG. 7 is a block diagram of the tensioner portion of the assemblage of FIG. 1 as viewed from the starboard side and used in conjunction with a shipboard crane.

As seen in FIG. 6, the assemblage may also include a flange weld station 60 immediately upstream of the tensioner 40 for attachment of the flange 61 to the trailing or second end of the pipeline P. Turning to FIG. 7, a cable 63, such as the cable normally used in conjunction with a ship's crane (not shown) to release or pick up pipe to or from a seabed, can be used with a sheave 65 and a ship's chain or cable 67 to suspend the pipeline P in the tensioner 40 from the flange 61 while work is performed on the pipeline P or the tensioner 40.

Figure 8:
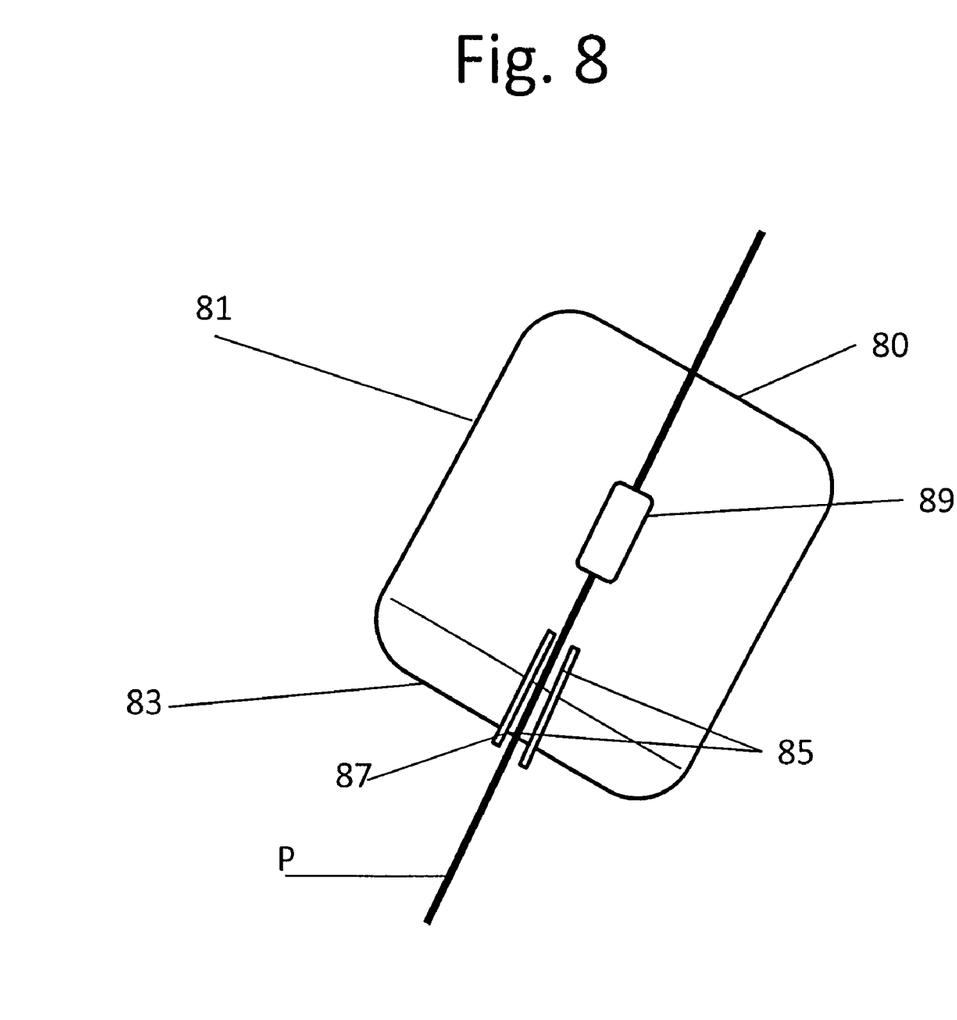
FIG. 8 is a block diagram of an anode weld station as viewed from the starboard side for use with the assemblage of FIG. 1.

As seen in FIGS. 6-8, an anode weld station 80 is located downstream of the tensioner 40 at the stern R of the ship V above the waterline W. As best seen in FIG. 8, the anode weld station 80 shelters one or more workmen in its work section 81 from sea turbulence. A pressurized section 83 has seals 85 around an annulus 87 through which the pipeline P exits the station 80. The sealed and pressurized section 83 reduces the splashing of turbulent seawater into the work section 81 in which the anodes 89 are welded to the pipeline P.

The method includes the steps of straightening the pipeline P from the plastic state into the behaviorally elastic state as it is unreeled and dispensing the straightened pipeline P in its behaviorally elastic state into a downstream pipe tensioner while maintaining the straightened pipeline P upstream of the tensioner in the behaviorally elastic state. Optionally, the steps may also include intermittently adding sacrificial anodes to the dispensed pipeline P before entry into the sea and/or welding a flange to a first end of the pipeline P before entry into the tensioner.

Thus it is apparent that there has been provided, in accordance with the invention, a method and assemblage for undersea laying of pipeline which is being unreeled in a plastic state from a ship spool that fully satisfies the objects, aims and advantages set forth above. While the invention has been described in conjunction with specific embodiments thereof, it is evident that many alternatives, modifications and variations will be apparent to those of ordinary skill in the art in light of the foregoing description. Accordingly, it is intended to embrace all such alternatives, modifications and variations as fall within the spirit of the appended claims.

What is claimed is:

1. A method for undersea laying of a pipeline stored in a plastically deformed state on a ship spool comprising the steps of:
   unreeling the pipeline from the spool through a straightener into a behaviorally elastic state as it is unreeled;
   feeding the pipeline in the behaviorally elastic state through a downstream pipe tensioner disposed at a predetermined angle relative to the straightener; and
   spacing the straightener and the tensioner at a distance sufficient to permit the pipeline between the straightener and the tensioner to freely remain in its behaviorally elastic state.

2. A method according to claim 1 further comprising the step of intermittently adding sacrificial anodes to the dispensed pipeline before entry into the sea.

3. A method according to claim 1 further comprising the step of welding a flange to a first end of the pipeline before entry into the tensioner.

4. For use in undersea laying of a pipeline stored in a plastically deformed state a ship spool, an assemblage comprising:
   a straightener receiving the pipeline from the spool and dispensing the pipeline in a behaviorally elastic state; and
   a tensioner downstream of said straightener receiving the pipeline in the behaviorally elastic state and dispensing the pipeline further downstream in the behaviorally elastic state, said tensioner being disposed at a predetermined angle relative to said straightener and spaced at a distance from said straightener sufficient to permit the pipeline between the straightener and the tensioner to freely remain in its behaviorally elastic state.

5. An assemblage according to claim 4, said straightener being mounted for reciprocation parallel to a rotational axis of the spool for shifting the pipeline within a fleeting angle range compatible with maintaining the behaviorally elastic state of the pipeline between said straightener and said tensioner.

6. An assemblage according to claim 4, said straightener being mounted for motion into cartesian coordinates corresponding with a variable release point of the pipeline from the spool to receive the pipeline in the plastically deformed state as the pipeline is unreeled from the spool.

7. An assemblage according to claim 6, said straightener being mounted for angular motion about an axis parallel to a rotational axis of the spool.

8. An assemblage according to claim 7, said straightener being mounted for angular motion about a rotational axis of the spool.

9. An assemblage according to claim 4, said straightener being mounted in alignment to release pipeline on an exit path from said straightener compatible with maintaining the behaviorally elastic state of the pipeline between said straightener and said tensioner.

10. An assemblage according to claim 9, said straightener being mounted to permit realignment thereof.

11. An assemblage according to claim 4, said tensioner being pivoted for angular motion about an axis parallel to a rotational axis of the spool to align said tensioner to release pipeline in the behaviorally elastic state on a predetermined initial exit path from said tensioner.

12. An assemblage according to claim 4 further comprising a flange weld station immediately upstream of said tensioner.

13. An assemblage according to claim 4 further comprising an anode weld station downstream of said tensioner in an above-waterline freeboard of the ship.

14. An assemblage according to claim 13, said anode weld station comprising a shelter shielding one or more workmen in said weld station from sea turbulence.

15. An assemblage according to claim 14 further comprising seals reducing splashing of turbulent seawater through an annulus surrounding a pipeline egress from said shelter.

16. An assemblage according to claim 4, said straightener being a second tensioner.

17. An assemblage according to claim 4:
   said tensioner being pivoted for angular motion about an axis parallel to a rotational axis of the spool to align said tensioner to release pipeline in the behaviorally elastic state on a predetermined initial exit path from said tensioner; and
   said straightener being mounted in an alignment to release pipeline on an exit path from said straightener coordinated with said exit path from said tensioner to maintain the behaviorally elastic state of the pipeline between exit from said straightener and entry into said tensioner.

18. An assemblage according to claim 17, said straightener being mounted for reciprocation parallel to a rotational axis of the spool for shifting the pipeline within a fleeting angle range compatible with maintaining the behaviorally elastic state of the pipeline between exit from said straightener and entry into said tensioner.

19. A method for undersea laying of a pipeline which has been stored in a plastically deformed state on a ship spool comprising the steps of:

determining a desired range of angles of a release path of the pipeline into the sea from a pipeline tensioner;

determining a desired range of alignments of an exit path of the pipeline from a straightener;

locating the straightener and the tensioner on the ship separated at a distance determined to be compatible with the desired ranges of angles and alignments to maintain the pipeline between the straightener and the tensioner in a behaviorally elastic state;

transforming the pipeline from the plastically deformed state to a behaviorally elastic state in the straightener with the straightener in a desired alignment; and delivering the transformed pipeline in the behaviorally elastic state into the tensioner with the tensioner at a desired angle.

* * * * *